US006915654B2

United States Patent
Johnson

(10) Patent No.: US 6,915,654 B2
(45) Date of Patent: Jul. 12, 2005

(54) PORTABLE COOLING MECHANISM

(76) Inventor: Ross Johnson, 305 N. Browning, Carthage, TX (US) 75633

( * ) Notice: Subject to any disclaimer, the term of this patent is extended or adjusted under 35 U.S.C. 154(b) by 22 days.

(21) Appl. No.: 10/175,273

(22) Filed: Jun. 19, 2002

(65) Prior Publication Data

US 2002/0194859 A1 Dec. 26, 2002

Related U.S. Application Data

(60) Provisional application No. 60/299,574, filed on Jun. 20, 2001.

(51) Int. Cl.[7] .................................................. F28C 1/00
(52) U.S. Cl. .......................... 62/259.4; 62/314; 62/315; 261/106
(58) Field of Search ............................... 62/121, 259.4, 62/304, 314, 315; 261/106, DIG. 3, DIG. 43

(56) References Cited

U.S. PATENT DOCUMENTS

| 2,639,905 | A | * | 5/1953 | Dow | 261/29 |
|---|---|---|---|---|---|
| 3,738,621 | A | * | 6/1973 | Anderson | 261/29 |
| 4,231,975 | A | * | 11/1980 | Peltier | 261/99 |
| 4,284,128 | A | * | 8/1981 | Nelson | 165/48.1 |
| 4,351,781 | A | * | 9/1982 | Blatter | 261/29 |
| 4,478,767 | A | * | 10/1984 | Watanabe et al. | 261/130 |
| 4,573,490 | A | * | 3/1986 | Kaletsky | 137/124 |
| 4,701,286 | A | * | 10/1987 | Stillman et al. | 261/36.1 |
| 4,798,060 | A | * | 1/1989 | Long et al. | 62/310 |
| 5,168,722 | A | | 12/1992 | Brock | |
| 5,497,633 | A | | 3/1996 | Jones et al. | |
| 5,598,719 | A | | 2/1997 | Jones et al. | |
| 5,715,698 | A | | 2/1998 | Calton | |
| 5,785,204 | A | | 7/1998 | Thompson et al. | |
| 5,802,865 | A | | 9/1998 | Strauss | |
| 5,857,350 | A | | 1/1999 | Johnson et al. | |
| 5,867,999 | A | | 2/1999 | Bratton et al. | |
| 6,101,831 | A | | 8/2000 | Ciccone | |
| 6,112,538 | A | | 9/2000 | Strussion | |

* cited by examiner

Primary Examiner—William E. Tapolcai
(74) Attorney, Agent, or Firm—Storm LLP

(57) ABSTRACT

An evaporative cooling system that can be easily transported and set up quickly in indoor or outdoor environments to provide effective cooling to a sizable area in a short time period. The system can be operated from standard AC household electrical power, or from a 12-volt DC power source, such as a car or marine battery. The system water tank can be filled with water, or connected to a water source for continual refilling. The system can also be used with a light-weight water source, holding approximately 2 liters of water for temporary cooling, or without water to move large volumes of air.

19 Claims, 4 Drawing Sheets

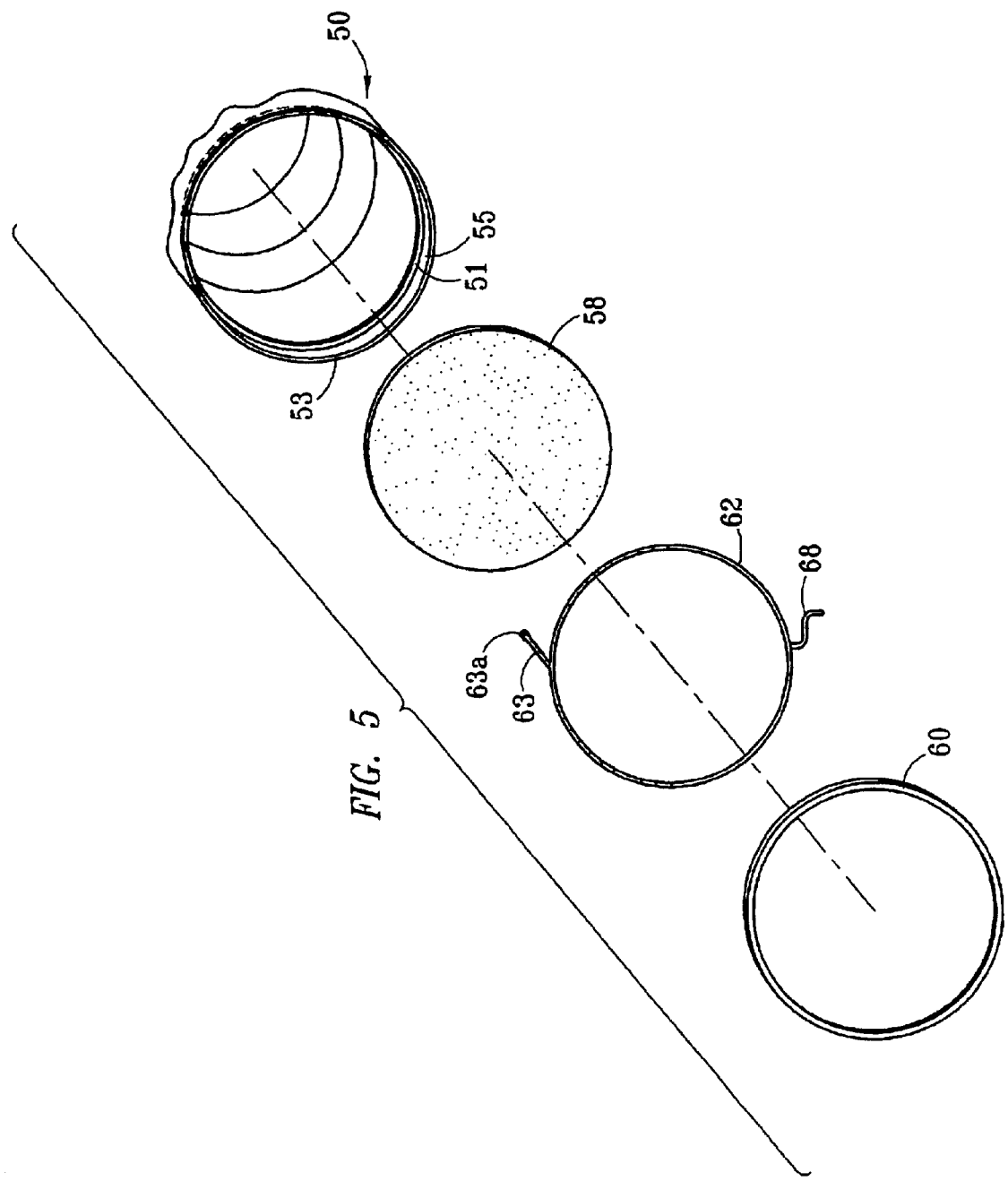

ized by the same reference numeral through the several views. FIG.

PORTABLE COOLING MECHANISM

CLAIM OF PRIORITY

This application claims priority from U.S. Provisional Patent Application No. 60/299,574 entitled "Portable Cooling Mechanism" filed on behalf of Ross Johnson, on Jun. 20, 2001.

TECHNICAL FIELD

The invention relates generally to air circulating and cooling mechanisms, in particular evaporative air cooling mechanisms, and, more particularly, to cooling mechanisms that can be transported to different places, as needed.

BACKGROUND

Cooling of air by circulation has been utilized for many years, as has cooling air by means of evaporative cooling, where dry, warm air is blown across or through a water source so that the air is rehumidified, and then recirculated. This cooling method is especially popular in the American Southwest, where air temperatures often exceed 100 degrees, and the air is dry.

Frequently, evaporative coolers are used for cooling in situations where the activities in which persons engage cause them to become warm, creating the threat of heat stress or heat exhaustion. These include situations such as fire fighting, high temperature work environments, and summer work or athletic activities. The use of an evaporative cooler in these situations can reduce the ambient air temperature 20 to 30 degrees Fahrenheit, and when the cooler, moist air is blown across a person's skin, it can help reduce body temperature, as well. Since many of these activities occur outside, and away from buildings and power and water supplies, standard prior art fans, air conditioners, or evaporative coolers that operate off standard household AC electrical current or must be connected to a running water source cannot be used.

Therefore, what is needed is an evaporative cooling system which can be easily transported to the location where it is needed, and quickly set up and powered to operate to provide cooling.

SUMMARY

The present invention, accordingly, provides an evaporative cooling system of a size and weight such that it can be easily transported and set up quickly, when and where it is needed, but is of a sufficient capacity, ruggedness and power to provide effective cooling to a sizable area in a short time period. The present invention can operate in indoor or outdoor environments, as needed. It operates from a DC power source, such as a 12-volt car or marine battery, for use in remote locations. In one configuration, the system can operate from standard AC household electrical power, or it can be hooked up to a DC power source, as described above.

The present invention has a water tank, which can be filled with water, or connected to a water source for continual refilling. In another configuration of the system, a small, light-weight water source, holding approximately 2 liters of water, can be connected to the unit. In yet another configuration of the system, both the water tank and the small, light-weight alternative water source are incorporated into the system, and either source can be connected. Since water weighs approximately 8.3 pounds/gallon, disconnecting the water tank and using the alternative water source will reduce the weight of the unit, so it can be easily moved to locations, such as in a construction site below ground, as needed for temporary cooling.

The invention comprises a portable evaporative air cooling apparatus having a blower unit comprising a fan, a spray bar capable of receiving water pumped from a water source that has one or more holes for spraying the water, and a cooling media for receiving water, all contained in a housing. The invention also comprises means for securing the spray bar and cooling media in the blower unit housing, and a stand for securing the blower unit to a water tank. The water tank comprises a tank, a lid, a means for filling the tank, a means for draining the tank, a receiver for securing the stand on the blower unit to the water tank, and a receiver tube in the underside for insertion of a mounting mechanism, such as a tripod. The system is attached to an electrical power supply, which provides power to the fan in the blower unit and a pump in the water tank that pumps water to the spray bar. There is also a receptacle in the blower unit housing for attaching a small, alternative water supply that can drip water onto the cooling media for use in situations where the water tank cannot be used.

The foregoing has outlined rather broadly the features and technical advantages of the present invention so that the detailed description of the invention that follows may be better understood. It should be appreciated by those skilled in the art that the specific embodiment disclosed may be readily modified to design other structures for carrying out the same purposes of the present invention. It should also be realized by those skilled in the art that such equivalent constructions do not depart from the spirit and scope of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 is a partially exploded view of the rear of the blower unit of the system.

DETAILED DESCRIPTION

In the following discussion, numerous specific details are set forth to provide a thorough understanding of the present invention. However, it is understood by those skilled in the art that the present invention may be practiced without such specific details.

Figure 1:
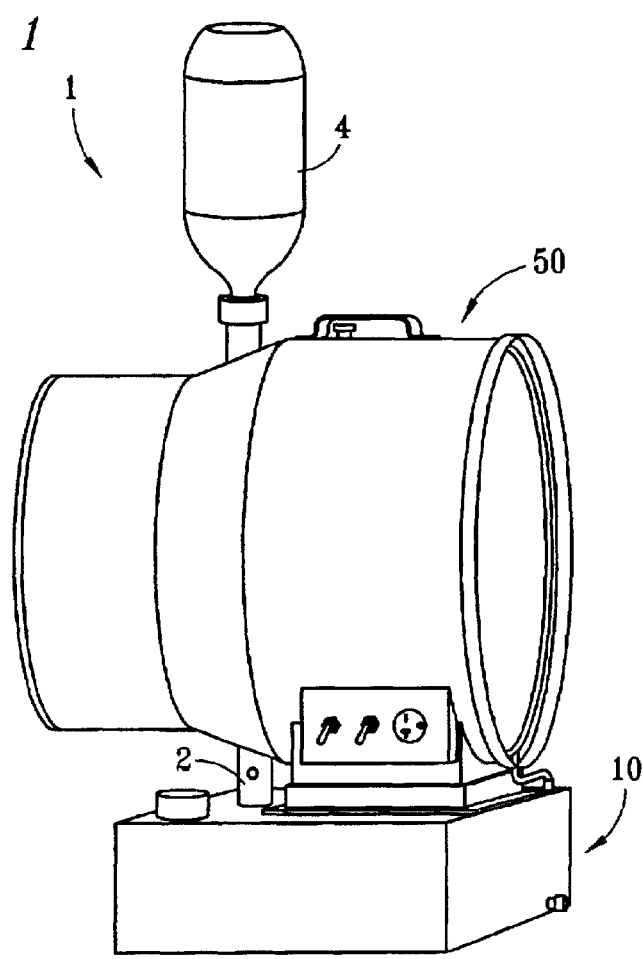
FIG. 1 is an assembled view of an evaporative cooling system embodying features of the present invention.

Referring now to the FIGURES, wherein depicted elements are, for the sake of clarity, not necessarily shown to scale and wherein like or similar elements are designated by the same reference numeral through the several views. FIG. 1 shows the evaporative cooling system 1 of the present invention. The primary components of the evaporative cooling system 1 are the stand 2, the alternative water source 4, the water tank 10, and the blower unit 50.

Figure 2:
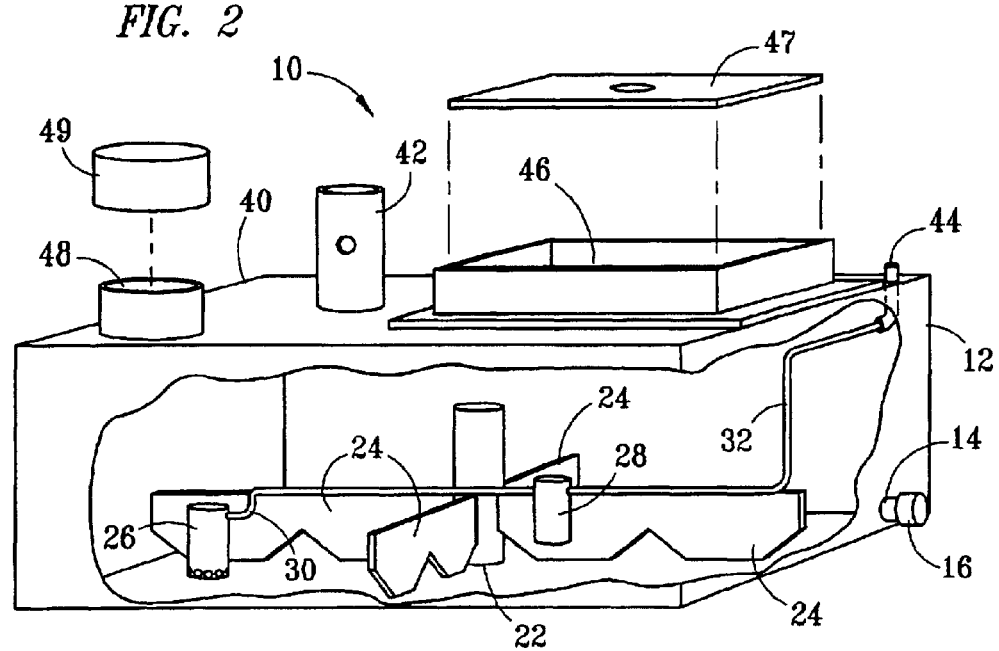
FIG. 2 is a partially cutaway view of the removable water tank of the system of FIG. 1.

In FIG. 2, an embodiment of the water tank 10 of the present invention is shown. The water tank 10 comprises a holding tank 12 which is preferably approximately 16 inches wide by 14 inches long by 6 inches deep, although other shapes and sizes may be used according to the arrangement of the invention. A drain 14 is located near the bottom portion of the holding tank 12 on the rear of the tank. The drain 14 is sealed with a drain plug 16 when the evaporative cooling system 1 is in use. The drain plug 16 can be removed from the drain 14, and the water in the holding tank 12 will exit by means of gravity.

In one arrangement of the present invention, a hollow receiver tube 22 extends into the holding tank 12 from the bottom, and is sealed around the point of ingress into the bottom of the holding tank 12, and at the open upper portion of the receiver tube 22. The opening of the receiver tube 22 at the bottom of the holding tank 12 will allow the insertion of a mounting mechanism, such as a tripod, into the evaporative cooling system 1 so it can be placed at variable heights and positioned in the desired location.

Inside the holding tank 12, braces 24 are secured to the outside diameter of the receiver tube 22 and to the holding tank 12. The braces 24 provide structural support to the water tank 10, and also act as baffles for water contained within the water tank 10.

A pump 26 is inserted in the holding tank 12. The pump 26 is connected to a filter 28, which is also inserted in the holding tank 12, by means of tubing 30. In one arrangement of the present invention, the pump 26 is secured to one of the braces 24 in the holding tank 12 to provide stability during operation. Another portion of tubing 32 connects the filter 28 to the hose barb 44 in the holding tank lid 40. The water pump 26 pumps water from the holding tank 12 through the tubing 30, the filter 28, and out the end of the tubing 32, as further described below.

A lid 40 is secured to the top of the holding tank 12. The lid 40 has an opening 46 which can be used to put water into the holding tank 12, if desired. The wiring 75 that connects a pump switch 74, shown in FIG. 3, to the water pump 26 to provide power to the pump is also inserted through an opening in the lid. In one arrangement of the present invention, a splash plate 47 can be inserted into the opening 46 that prevents water in the holding tank 12 from exiting through the opening 46 when the evaporative cooling system 1 is being moved.

The opening 46 is preferably rectangular and has a flange around the edge which corresponds with a similar opening in the bottom of the blower unit 50, although other shapes may be used according to the invention. The hose barb 44 also protrudes through the holding tank lid 40. The filler hole 48 is used to fill the water tank 10 by means of a water hose or other method. A cover 49 is placed over the filler hole 48 when it is not in use to prevent water from spilling out of the filler hole 48.

There is also a receiver 42 in the holding tank lid 40. The stand 2 which is attached to the blower unit 50 can be inserted into the receiver 42 to attach the blower unit 50 to the water tank 10. There is at least one through-material hole in the receiver 42 that corresponds with a hole in the stand 2 to provide means for securing the stand 2 to the water tank 10. This provides stability for the blower unit 50, and can be used to provide a method of locking the blower unit 50 to the water tank 10 to prevent theft.

Figure 3:
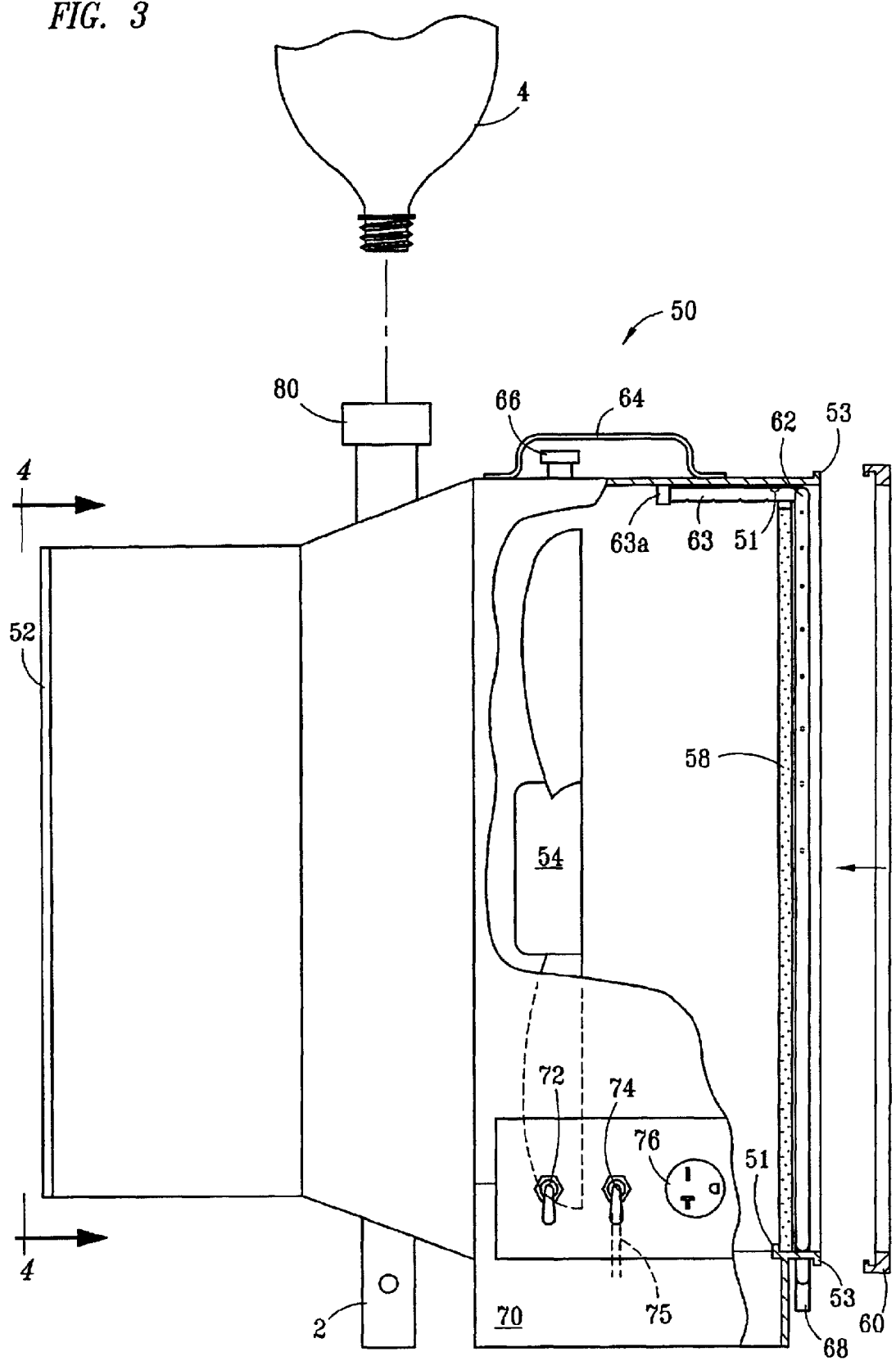
FIG. 3 is a partially cutaway side view of the blower unit of the system of FIG. 1.

In FIG. 3, an embodiment of the blower unit 50 of the present invention is shown. In a preferred arrangement of the present invention, blower unit 50 is preferably approximately 18 inches long by 24 inches high by 18 inches wide at the rear portion of the blower unit, with the unit tapering to approximately 15 inches high by 15 inches wide at the front of the unit. The preferred size of the blower unit 50 allows the unit to be portable; however, other sizes of blower unit 50 may be used according to the invention.

A handle 64 is attached to the top of the blower unit 50, for carrying the blower unit 50, or the entire evaporative cooling system 1, if the blower unit 50 is secured to the water tank 10. The handle can be oriented as shown in FIG. 3, or rotated to a different angle as appropriate for the particular arrangement of the invention. Also on the top of the blower unit 50 is a receptacle 80 into which the alternative water supply 4 can be inserted, if it is included with the system.

A control panel 70 is secured to one side of the blower unit 50. The control panel 70 preferably contains a fan motor switch 72 to turn the blower fan 54 on and off. The control panel 70 also contains a pump switch 74 to turn the pump 26 on and off. Alternatively, a single switch (not shown) may be used to turn on and off both the blower fan 54 and pump 26. The control panel 70 also preferably contains electrical connections and a female 20 amp AC electrical receptacle 76. While the control panel is shown as having the switches on the side of the unit for ease of viewing, depending on the application for which the evaporative cooling system 1 will be used, the unit may be configured so that the switches, and possibly the electrical receptacle are located on the bottom of the control panel, rather than the side to protect the switches from being damaged in transit or use.

Figure 4:
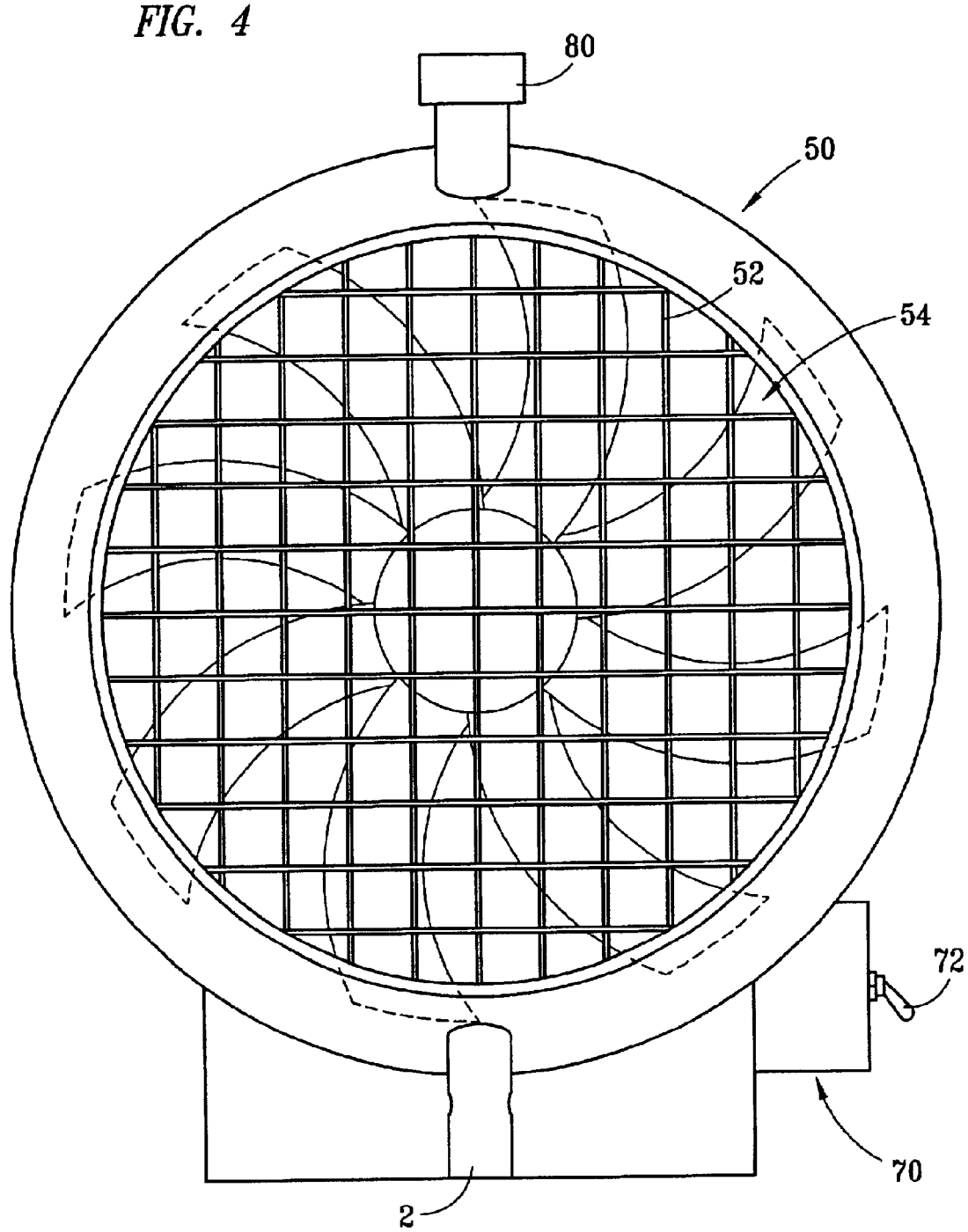
FIG. 4 is front view of the blower unit of the system taken along line 4—4 of FIG. 3.

As shown in FIG. 4, protective screening 52 is attached to the front of the unit to prevent accidental access of materials or persons into the blower fan 54 contained within the blower unit 50.

FIG. 5 provides a detailed view of the elements of the cooling mechanism at the rear of the blower unit 50. Cooling media 58 is inserted in the rear of the blower unit 50. A lip 51 that encircles the inside of the blower unit 50 serves as a stop for the front of the cooling media 58. The lip is continuous, except for an opening at the top that allows the arm 63 of the spray bar 62 to protrude into the blower unit 50.

A spray bar 62 is positioned behind the cooling media 58. In one arrangement of the present invention, the spray bar 62 is circular in shape and sized to fit inside the rear of the blower unit 50, with holes for spraying of water in only the upper portion of the circular shape. The spray bar 62 had an arm 63 that extends into the blower unit 50. The arm 63 can have holes for spraying of water on the bottom of the arm. Typically, the arm 63 has a removable end piece 63a that can also have a hole in it which can be removed from the arm 63 to clean out any debris that may have accumulated in the spray bar 62. The spray bar 62 also has an elbow at the bottom to which to connect the tubing 68 that connects at the other end to the portion of the hose barb 44 that extends above the top of the holding tank lid 40. A raised flange 53 encircles the outside of the blower unit at rear edge. The cooling media 58 and spray bar 62 are retained in the rear of the blower unit 50 by means of a sealing gasket 60 that fastens around the raised flange 53.

In operation, the evaporative cooling unit 1 is connected to an electrical power source through the control panel 70. The blower fan 54 is turned on at the control panel 70 by means of the fan motor switch 72. The pump 26 in the water tank 10 is turned on at the control panel 70 by means of the pump switch 74. The pump 26 pumps water from the holding tank 12 through the tubing 30 to the filter 28, then into the tubing 32, through the hose barb 44, into the tubing 68 and into the spray bar 62. The spray bar 62 sprays water onto the cooling media 58 so that the cooling media 58 is kept evenly and continuously moistened.

The blower fan 54 draws air in through the rear of the blower unit 50. As the air is drawn through the cooling media 58, it absorbs water from the cooling media 58, and the moist, cooler air is blown out the front end of the blower unit 50. A damper 66 may be located on the top of the blower unit 50. It can be adjusted to a closed or an open position to direct the flow of the water stream from the hole in the end of the removable end piece 63a into the blower unit 50, or back down into the water tank 10, respectively. This water is pulled into the fan blades, and atomized into a fine mist, which is blown out with the air for additional evaporative cooling.

Any surplus moisture in the cooling media 58 which is not retained in the cooling media 58 or blown out into the air drips from the bottom of the cooling media 58 through a drain hole 55 in the bottom of the blower that aligns with the opening 46 in the holding tank lid 40 and thus back into the water tank 10. A flange around the opening in the bottom of the blower fits inside the flange on the opening 46 so that all the water drips back into the water tank 10.

If the unit is only provided with an alternative water supply 4, or if it is desired to use the blower unit 50 with the alternative water supply 4, rather than with the water tank 10, the stand 2 can be disconnected from the receiver 42 in the holding tank lid 40, along with the tubing 68 being disconnected from the spray bar 62 and electrical connection to the pump 26 being disconnected. The blower unit can then be used alone as a fan, or the alternative water supply 4 can be placed in the receptacle 80 in the top of the blower unit 50. The alternative water supply 4 drips water down between the cooling media 58, and the fan blades. The water is pulled into the fan blades, and atomized into a fine mist, which is blown out with the air. The blower unit 50 can be mounted to a tripod or other mounting mechanism, if desired, inserted into the stand 2, and can be easily moved to needed locations, given the lighter weight of the unit without a water tank 10 and the water it contains having to be moved as well. When using the system in this manner, the alternative water supply 4 can last over an hour before needing to be refilled.

It is understood that the present invention can take many forms and embodiments. Accordingly, several variations may be made in the foregoing without departing from the spirit or the scope of the invention.

What is claimed is:

1. A portable evaporative air cooling apparatus comprising:
   a) a portable blower unit comprising a housing, a fan, a spray bar having one or more holes for spraying water pumped from a water source, a cooling media for receiving water, a means for securing the spray bar and cooling media in the blower unit housing, and a stand for securing the blower unit;
   b) a water tank, separable from the blower unit, comprising a tank, a lid having one or more openings, a means for draining the tank, and a means for receiving the stand on the blower unit that incorporates locking means to prevent disassembly or removal;
   c) a means for pumping water from the water tank to the spray bar in the blower unit; and
   d) means for supplying electrical power to the apparatus to activate the fan and the water pumping means.

2. The apparatus of claim 1, further comprising screening material secured to the front of the blower unit housing to prevent accidental access to the fan in the blower unit.

3. The apparatus of claim 1 further comprising braces in the water tank secured to the water tank.

4. The apparatus of claim 1 further comprising a damper mechanism in the blower unit to control the flow of water into the blower unit.

5. A portable evaporative air cooling apparatus comprising:
   a) a portable blower unit comprising a housing, a fan, a spray bar having one or more holes for spraying water pumped from a water source, a cooling media for receiving water, a means for securing the spray bar and cooling media in the blower unit housing, a receptacle for receivedly attaching an alternative water supply and a stand for securing the blower unit;
   b) a water tank, separable from the blower unit, comprising a tank, a lid having one or more openings, a means for draining the tank, and a means for receiving the stand on the blower unit;
   c) a means for pumping water from the water tank to the spray bar in the blower unit; and
   d) means for supplying electrical power to the apparatus.

6. The apparatus of claim 5 further comprising braces in the water tank secured to the water tank.

7. The apparatus of claim 5 further comprising a damper mechanism in the blower unit to control the flow of water into the blower unit.

8. The apparatus of claim 5 further comprising an alternative water supply inserted into the receptacle in the blower unit for dripping water onto the fan.

9. A portable evaporative air cooling apparatus comprising:
   a) a portable blower unit comprising a housing, a fan, a spray bar having one or more holes for spraying water pumped from a water source, a cooling media for receiving water, a means for securing the spray bar and cooling media in the blower unit housing, a receptacle for receivedly attaching an alternative water supply and a stand for securing the blower unit;
   b) a water tank, separable from the blower unit, comprising a tank, a lid having one or more openings, a means for draining the tank, and a means for receiving the stand on the blower unit;
   c) a means for pumping water from the water tank to the spray bar in the blower unit; and
   d) means for supplying electrical power to the apparatus to activate the fan and the water pumping means.

10. The apparatus of claim 9 further comprising an alternative water supply inserted into the receptacle in the blower unit for dripping water onto the fan.

11. The apparatus of claim 9 further comprising braces in the water tank secured to the water tank.

12. The apparatus of claim 9 further comprising a damper mechanism in the blower unit to control the flow of water into the blower unit.

13. A portable evaporative air cooling apparatus comprising:
   a) a blower unit comprising a housing, a fan, a spray bar having one or more holes for spraying water pumped from a water source, a cooling media for receiving water, a means for securing the spray bar and cooling media in the blower unit housing, a damper mechanism to control the flow of water into the blower unit and a stand for securing the blower unit;
   b) a water tank comprising a tank, a lid having one or more openings, a means for draining the tank, and a means for receiving the stand on the blower unit that incorporates locking means to prevent disassembly or removal;

c) a means for pumping water from the water tank to the spray bar in the blower unit; and d) means for supplying electrical power to the apparatus to activate the fan and the water pumping means.

14. The apparatus of claim 13 further comprising braces in the water tank secured to the water tank.

15. A portable evaporative air cooling apparatus comprising:

a) a portable blower unit comprising a housing, a fan, a spray bar having one or more holes for spraying water pumped from a water source, a cooling media for receiving water, a means for securing the spray bar and cooling media in the blower unit housing, and a stand for securing the blower unit;

b) a water tank, separable from the blower unit, comprising a tank, a lid having one or more openings, a means for draining the tank, a means for receiving the stand on the blower unit and a receiver tube in the water tank that projects into the tank from the bottom having an opening to the outside, which is sealed at the point of ingress to the tank and at the top of the receiver tube;

c) a means for pumping water from the water tank to the spray bar in the blower unit; and d) means for supplying electrical power to the apparatus to activate the fan and the water pumping means.

16. The apparatus of claim 15 further comprising braces in the water tank secured to the receiver tube and the water tank.

17. The apparatus of claim 15 further comprising a stand having generally circular projection of at least one portion of the stand that has an outside diameter less than the inside diameter of the receiver tube such that it can be inserted into the receiver tube to provide support for the apparatus.

18. The apparatus of claim 15 further comprising a stand having generally circular projection of at least one portion of the stand that has an outside diameter less than the inside diameter of the receiver tube such that it can be inserted into the receiver tube to provide support for the apparatus and a means for adjusting the height of the stand.

19. The apparatus of claim 15 further comprising a damper mechanism in the blower unit to control the flow of water into the blower unit.

* * * * *